United States Patent
Hu

(10) Patent No.: US 12,060,997 B1
(45) Date of Patent: Aug. 13, 2024

(54) COMBUSTOR WITH DISTRIBUTED AIR AND FUEL MIXING

(71) Applicant: Pratt & Whitney Canada Corp., Longueuil (CA)

(72) Inventor: Tin Cheung John Hu, Markham (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/346,591

(22) Filed: Jul. 3, 2023

Related U.S. Application Data

(60) Provisional application No. 63/442,819, filed on Feb. 2, 2023.

(51) Int. Cl.
*F23R 3/28* (2006.01)
*F23R 3/00* (2006.01)

(52) U.S. Cl.
CPC .............. *F23R 3/286* (2013.01); *F23R 3/002* (2013.01)

(58) Field of Classification Search
CPC ................................. F23R 3/002; F23R 3/286
See application file for complete search history.

(56) References Cited

U.S. PATENT DOCUMENTS

| | | | |
|---|---|---|---|
| 4,100,733 A | 7/1978 | Striebel et al. | |
| 4,455,840 A | 6/1984 | Matt et al. | |
| 4,578,946 A | 4/1986 | Readman et al. | |
| 5,289,685 A * | 3/1994 | Hoffa | F02C 7/222 |
| | | | 60/746 |
| 5,303,542 A * | 4/1994 | Hoffa | F02C 9/34 |
| | | | 60/773 |
| 5,836,289 A | 11/1998 | Thring | |
| 6,145,496 A | 11/2000 | Pace et al. | |
| 6,267,585 B1 * | 7/2001 | Suttrop | F23D 14/70 |
| | | | 431/278 |
| 7,017,329 B2 | 3/2006 | Farhangi et al. | |
| 7,832,212 B2 | 11/2010 | Bunker | |
| 7,870,736 B2 | 1/2011 | Homitz et al. | |

(Continued)

FOREIGN PATENT DOCUMENTS

| | | |
|---|---|---|
| CN | 101220955 | 7/2008 |
| CN | 206113000 | 4/2017 |

(Continued)

OTHER PUBLICATIONS

European Search Report for EP Application No. 24155608.3 dated May 27, 2024.

*Primary Examiner* — Lorne E Meade
(74) *Attorney, Agent, or Firm* — Carlson, Gaskey & Olds, P.C.

(57) ABSTRACT

A combustor includes a liner defining a combustion chamber and receiving a fuel and air mixing body. The mixing body has a central fuel supply, and radial distribution passages communicating fuel from the central fuel supply radially outwardly relative to a central axis of the central fuel supply and to mixing passages. The radial distribution passages have injection ports in the mixing passages. The mixing passages extend from a rear face of the mixing body to an inner face facing into the combustion chamber. Air inlets in the mixing body communicate air into the mixing passages, and there is cellular material in the mixing passages at a location at which the fuel is injected into the mixing passages. A gas turbine engine is also disclosed.

14 Claims, 4 Drawing Sheets

(56) References Cited

U.S. PATENT DOCUMENTS

| | | | |
|---|---|---|---|
| 8,234,871 B2* | 8/2012 | Davis, Jr. | F23R 3/12 60/737 |
| 8,266,911 B2 | 9/2012 | Evulet | |
| 8,413,445 B2* | 4/2013 | Poyyapakkam | F23R 3/286 60/737 |
| 8,539,773 B2 | 9/2013 | Ziminsky et al. | |
| 8,661,779 B2 | 3/2014 | Laster et al. | |
| 8,794,545 B2 | 8/2014 | Johnson et al. | |
| 8,893,500 B2 | 11/2014 | Oskam | |
| 9,360,220 B2 | 6/2016 | Chen et al. | |
| 9,534,787 B2 | 1/2017 | Westmoreland et al. | |
| 9,771,869 B2 | 9/2017 | Li et al. | |
| 9,803,866 B2 | 10/2017 | Yoshi | |
| 9,976,522 B2 | 5/2018 | Patel et al. | |
| 10,082,294 B2 | 9/2018 | Laster et al. | |
| 10,267,522 B2 | 4/2019 | Ciani et al. | |
| 10,502,425 B2 | 12/2019 | Boardman et al. | |
| 10,704,786 B2 | 7/2020 | Laster et al. | |
| 10,865,989 B2 | 12/2020 | Sadasivuni | |
| 10,941,940 B2 | 3/2021 | Bulat et al. | |
| 11,067,280 B2 | 7/2021 | Boardman et al. | |
| 11,248,795 B2* | 2/2022 | North | F23D 14/82 |
| 2004/0068973 A1 | 4/2004 | Wakabayashi et al. | |
| 2004/0144094 A1 | 7/2004 | Moriya et al. | |
| 2011/0185703 A1 | 8/2011 | Dodo et al. | |
| 2012/0227411 A1 | 9/2012 | Carroni et al. | |
| 2013/0192243 A1* | 8/2013 | Boespflug | F23R 3/286 60/776 |
| 2014/0075949 A1 | 3/2014 | Prociw | |
| 2017/0146242 A1 | 5/2017 | Meadows et al. | |
| 2017/0211807 A1 | 7/2017 | Graichen | |
| 2017/0227224 A1 | 8/2017 | Oskam et al. | |
| 2017/0307210 A1 | 10/2017 | Hirano et al. | |
| 2021/0172413 A1 | 6/2021 | Snyder | |
| 2022/0178540 A1 | 6/2022 | Chandra et al. | |
| 2022/0333781 A1 | 10/2022 | Chandra et al. | |

FOREIGN PATENT DOCUMENTS

| | | |
|---|---|---|
| EP | 1923637 | 5/2008 |
| JP | 2003056365 | 2/2003 |
| JP | 2013108667 | 6/2013 |
| JP | 5538113 | 7/2014 |
| JP | 5926635 | 5/2016 |
| WO | 2016051756 | 4/2016 |
| WO | 2020259919 | 12/2020 |

* cited by examiner

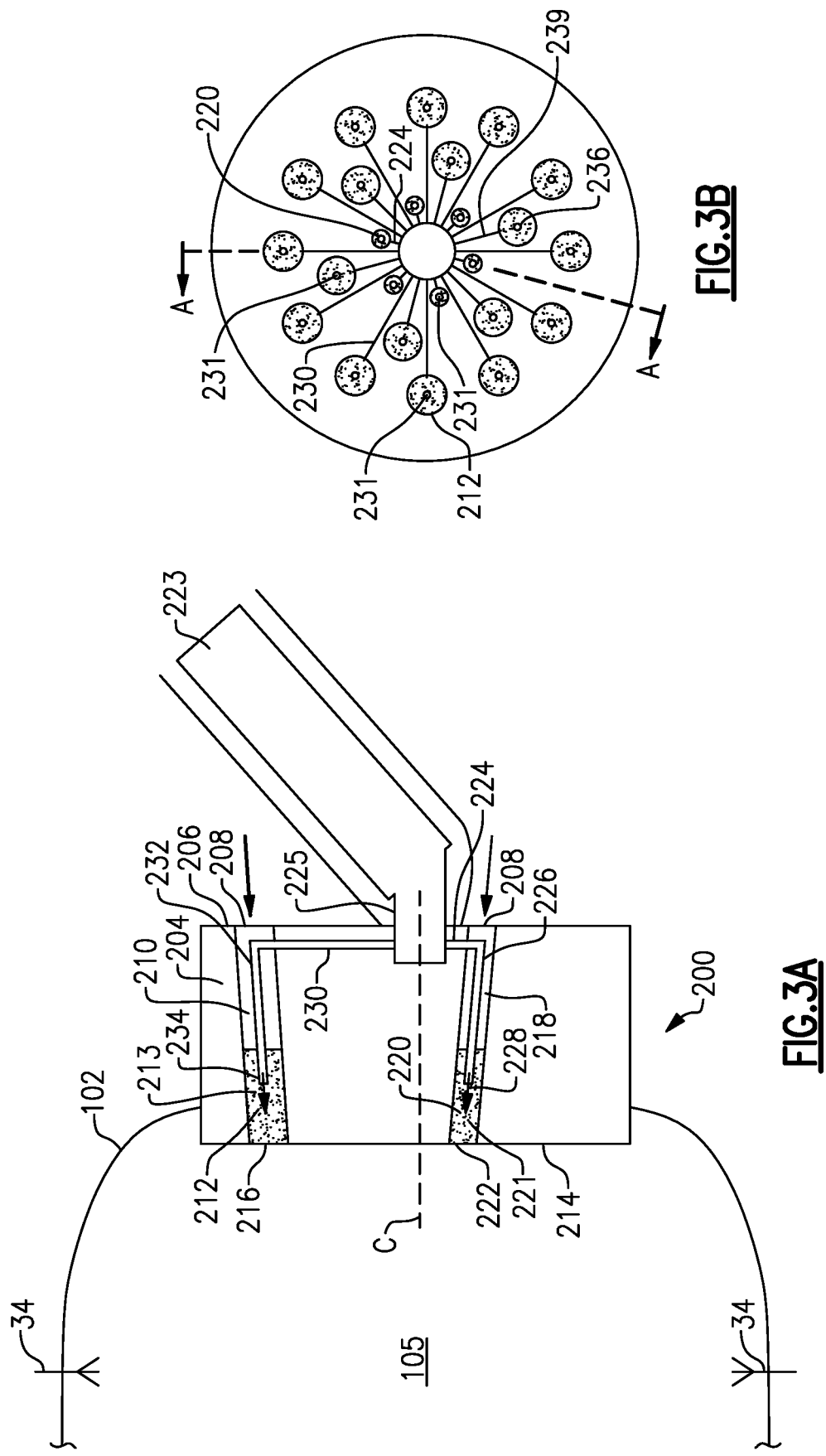

COMBUSTOR WITH DISTRIBUTED AIR AND FUEL MIXING

CROSS-REFERENCE TO RELATED APPLICATIONS

This application claims priority to U.S. Provisional Application No. 63/442,819 filed on Feb. 2, 2023.

BACKGROUND

This application relates to a combustor for using a gas turbine engine wherein there is an air and fuel mixing structure.

Gas turbine engines are known, and typically include a compressor delivering compressed air into a combustor. Compressed air is mixed with fuel and ignited. Products of the combustion pass downstream over turbine rotors, driving them to rotate. The turbine rotors in turn rotate a compressor rotor and a propulsor rotor such as a fan or propeller.

Historically, aviation fuel has been utilized with gas turbine engines, especially for aircraft applications. More recently it has been proposed to utilize hydrogen ($H_2$) as a fuel.

SUMMARY

A combustor includes a liner defining a combustion chamber and receiving a fuel and air mixing body. The mixing body has a central fuel supply, and radial distribution passages communicating fuel from the central fuel supply radially outwardly relative to a central axis of the central fuel supply and to mixing passages. The radial distribution passages have injection ports in the mixing passages. The mixing passages extend from a rear face of the mixing body to an inner face facing into the combustion chamber. Air inlets in the mixing body communicate air into the mixing passages, and there is cellular material in the mixing passages at a location at which the fuel is injected into the mixing passages.

A gas turbine engine is also disclosed.

These and other features will be best understood from the following drawings and specification, the following is a brief description.

BRIEF DESCRIPTION OF THE DRAWINGS

FIG. 3A shows a second embodiment combustor.

FIG. 3B is a cross-sectional view of the FIG. 3A combustor, with the line A-A showing the relative location of the FIG. 3A section.

DETAILED DESCRIPTION

Figure 1:
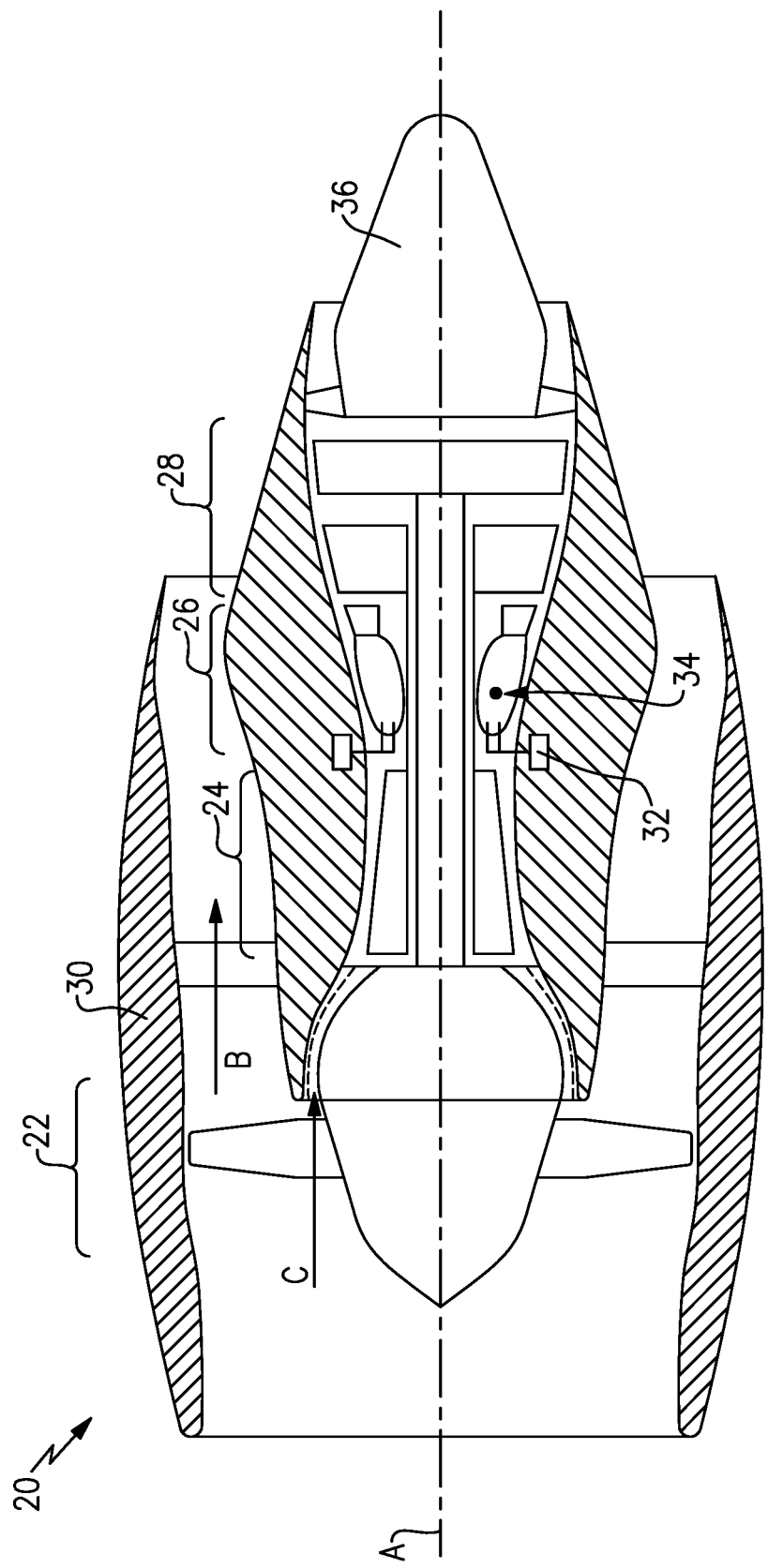
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

A gas turbine engine as disclosed in this application will utilize hydrogen ($H_2$) as a fuel. Challenges are faced by the use of hydrogen, and in particular combustor structure which might be appropriate for aviation fuel may not be as applicable to hydrogen as a fuel.

One challenge when utilizing hydrogen as a fuel is that it is in a gaseous state inside the combustor and more readily flammable than liquid aviation fuel. This could raise challenges with flashback if the local flame speed is higher than the fuel-air mixture inlet speed into the combustor.

Figure 2A:
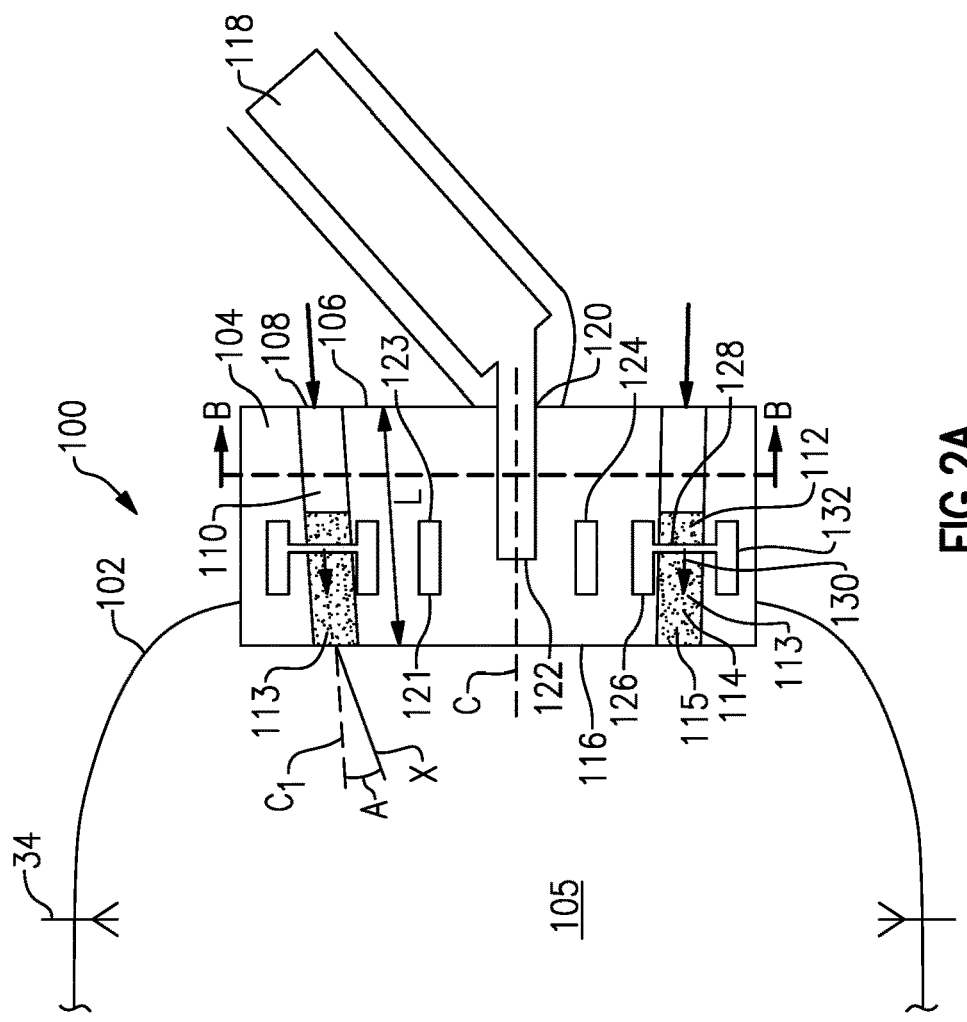
FIG. 2A show a first embodiment combustor.

FIG. 2A shows a combustor embodiment 100 having a liner 102 (shown partially) and igniters 34. An air and fuel mixing body 104 is secured to the liner 102. A rear face 106 has a plurality of air inlets 108 delivering air into passages 110. The air moves downstream of passages 110 and encounters a section 112 full of a cellular material, such as a metal foam or cellular metallic materials (CMM). In some embodiments the metal foam may be Inconel®. Fuel and air passes through the cellular materials, as explained below, and the mixed fuel and air move into an extending passage portion 113 also having the cellular material 114. The passage portion 113 ends at an end face 115, and mixed fuel and air are delivered into a combustion chamber 105.

Fuel is delivered from a fuel supply 118 into a central fuel passage 120. Central fuel passage 120 is centered on the center line C. Note that the central fuel passage 120 ends at a forward end 122. Radial distribution passages (see FIG. 2B) communicate central fuel passage 120 to distribution rings 124. Note the distribution rings 124 extend between a forward end 121 and a rear end 123. The forward end 122 of the central fuel passage 120 is spaced rearwardly relative to the forward end 121 of rings 124.

Figure 2B:
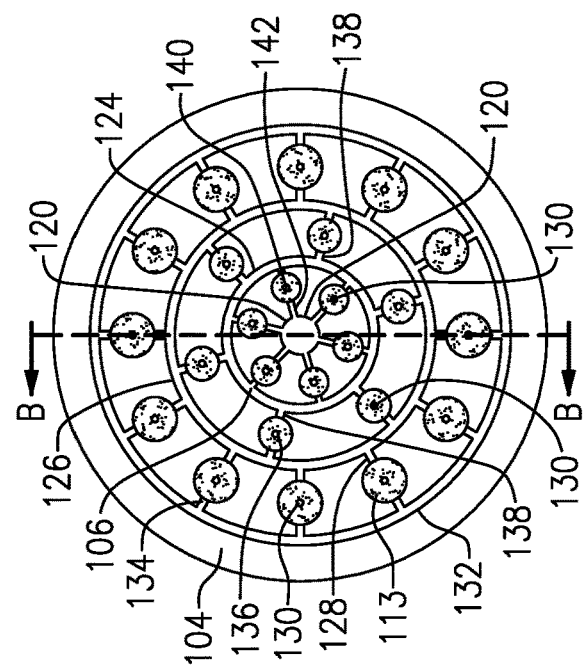
FIG. 2B is a view along line B-B of FIG. 2A a cross-section.

An intermediate distribution ring 126 communicates with distribution ring 124 through radial distribution passages (see FIG. 2B). The intermediate distribution ring 126 communicates through radial distribution passages 128 to an outer distribution ring 132. As can be seen, the mixing passages 110/113 extend radially inwardly relative to the central axis C along a direction X, forming a small angle A relative to the central axis $C_1$ or C.

As shown in FIG. 2B the inner distribution ring 124 receives fuel from the central fuel passage 120 through radial fuel passages 142. Fuel from radial distribution passages 142 extends into mixing passages 140, and then into outer radial distribution passage portions which communicate the fuel to the inner distribution ring 124.

From the inner distribution ring 124 the fuel passes into radial distribution passages 138, and to an intermediate row of mixing passages 136. Portions of the passage 138 radially outwardly of the mixing passages 136 communicate fuel to the intermediate distribution ring 126. Radial distribution passages 128 extend through outer mixing passages 113, and to the outer distribution ring 132 through passages 134.

Each of the radial distribution passages in each of the three illustrated radially spaced groups have injection ports 130 which inject fuel into the mixing passages 140, 136 and 113, downstream of the radial distribution passages.

The mixing passages 140 and 136 may be angled inwardly and contain cellular structure like the passages 110/113. Each of the mixing passages 113, 136 and 140 have the cellular material and the areas without cellular material as illustrated with regard to mixing passages 110/113 in FIG. 2A.

As can be seen, a cross-sectional area of the mixing passages decreases from an outer passages 113, through the middle passages 136 and to the inner passages 140. This increasing cross-section area will assist in driving fuel to the radially outer passages relative to the inner passages 140.

FIG. 3A shows another embodiment combustor 200. Again, a liner 102 mounts a fuel and air mixing body 204. Here the fuel feed 223 extends to a central fuel feed passage 225 centered on an axis C. A rear face 206 has air inlets 208 into mixing passages 210. The mixing passages 210 extend to an extending passage portion 212 which receives the cellular material 213. Mixing passages 210/212 provide a radially outer set of the mixing passages. An inner mixing passage 218 extends to an extending passage portion 220 having the cellular material 221. The passage portion 212 extends to outlet 216 at an inner face 214 of the mixing body 204. The passage portion 220 extends to an outlet 222 and into the combustion chamber 105. The passages again extend into combustion chamber 105 along a direction with a small radially inward component.

Shown in FIG. 3B, in the mixing body 204 the distribution rings have been eliminated. Rather, a dedicated radial distribution passage communicates fuel from inner feed 225 to each of the mixing passages.

Thus, radially extending passage portions 230 are shown extending to mixing passages 212. Radial distribution passages 239 are shown extending to the intermediate mixing passages 236. Passages 224 are shown communicating to the inner mixing passages 220. Ports 231 in each distribution passage allow fuel to flow into the mixing passages.

In this embodiment, the radially inner set of passages 220 have a smaller cross-sectional area than the passages in the intermediate and outer passage sets 236 and 212.

Figure 4:
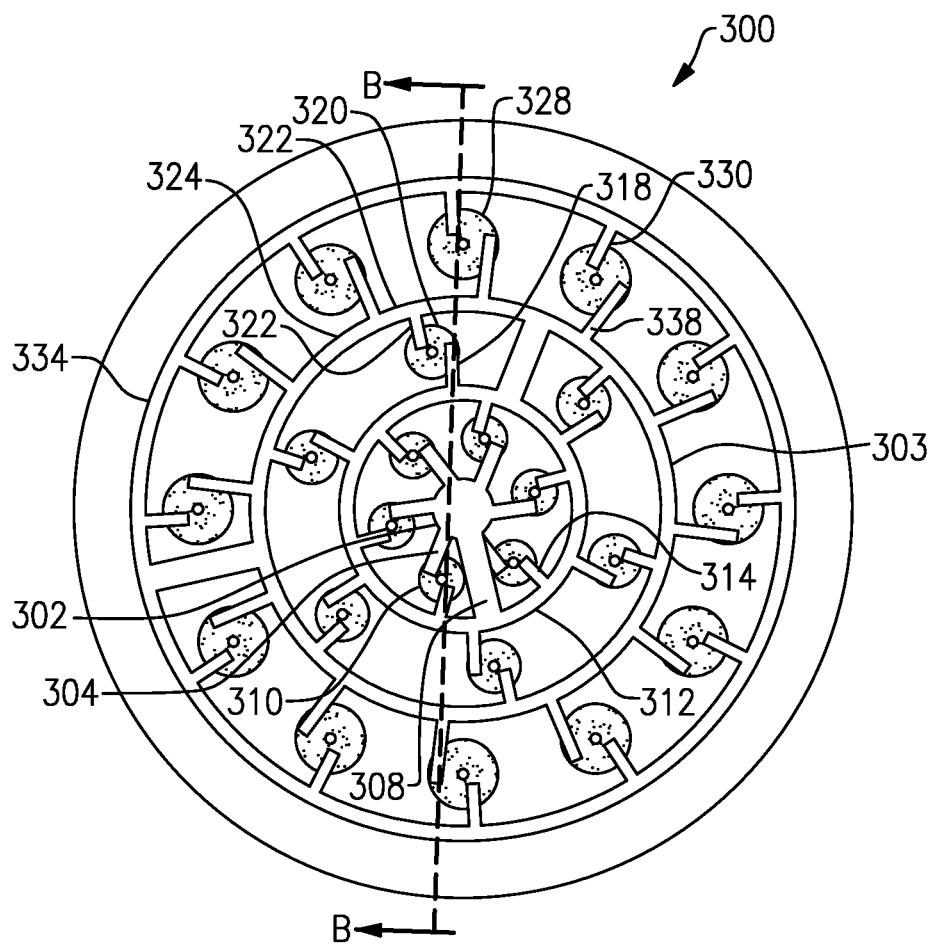
FIG. 4 shows another embodiment fuel and air mixing scheme.

FIG. 4 shows a mixing body embodiment 300 which is generally similar to the FIG. 2A embodiment. Here there are distribution rings 312, 324 and 334 receiving the fuel from the central supply 302.

The central fuel supply 302 communicates to radial distribution passages 304, and into mixing passages 310. The mixing passages 310 have an outer radial distribution passage 314 communicates fuel to an inner distribution ring 312. Passages 308 communicate fuel from supply 302 directly to distribution ring 312. Note that contrary to the FIG. 2A embodiment the radially inner distribution passage 304 is not aligned with the radially outer distribution passage 314. This facilitates movement of the fuel within the mixing passages 310, and results in better mixing.

From the ring passage 312 fuel flows through a radial distribution passage 318 into an intermediate mixing passages 320. The fuel then passes into an outer radial distribution passage 322 to communicate to an intermediate distribution ring 324.

From intermediate distribution ring 324 the fuel passes into radial distribution passages 338, and into outer mixing passages 328. From outer mixing passages 328 the fuel passes into an outer radial distribution passage 330 to communicate the fuel to an outer distribution ring 334.

In the FIG. 4 embodiment, the mixing passages also include cellular material.

Notably, for purposes of this application the term "radially" should not be interpreted to mean directly radially. Instead, it is intended to make clear the passages extend along a direction with a component in a radial direction.

A combustor 100/200/300 under this disclosure could be said to include a liner 102 defining a combustion chamber 105 and receiving a fuel and air mixing body 104/204. The mixing body has a central fuel supply 120/225. Radial distribution passages 142 communicate fuel from the central fuel supply radially outwardly relative to a central axis of the central fuel supply and to mixing passages 113/136/140. The radial distribution passages 142 have injection ports 130 in the mixing passages. The mixing passages extend from a rear face 106 of the mixing body to an inner face 116 facing into the combustion chamber. Air inlets 108 in the mixing body for communicating air into the mixing passages. There is cellular material 114 in the mixing passages at a location at which the fuel is injected into the mixing passages.

In another embodiment according to the previous embodiment, a first set of the radial distribution passages 142 communicate fuel into a first inner set of mixing passages 130. The first set of radial distribution passages also communicate outwardly of the first set of mixing passages into a fuel distribution ring 124. There is a second set of the radial distribution passages 136 communicating fuel from the inner distribution ring into an outer set of mixing passages, and then radially outwardly into a third distribution ring 132.

In another embodiment according to any of the previous embodiments, a source of fuel is connected to the central fuel supply. The source of fuel is gaseous hydrogen.

In another embodiment according to any of the previous embodiments, outer set of the mixing passages 113 have a greater cross-sectional area than the first set of mixing passages 130.

In another embodiment according to any of the previous embodiments, the radial distribution passages have an inner portion extending and through the mixing passages to an outer portion to communicate fuel to a radially outward set of the mixing passages such that there is a single radial distribution passage to communicate the central fuel supply to the inner distribution ring.

In another embodiment according to any of the previous embodiments, the radial distribution passages have an inner portion and an outer portion. The inner and outer portions are separate and circumferentially spaced within the mixing passages.

In another embodiment according to any of the previous embodiments, the central fuel supply defines a central axis. The mixing passages extend along a direction with a radially inward component relative to the central axis.

In another embodiment according to any of the previous embodiments, a source of fuel is connected to the central fuel supply. The source of fuel being gaseous hydrogen.

In another embodiment according to any of the previous embodiments, the radial distribution passages extend outwardly from the central fuel supply to communicate into each of a plurality of radially spaced sets of the mixing passages such that there is a single radial distribution passage bringing fuel to each of the mixing passages.

In another embodiment according to any of the previous embodiments, a source of fuel is connected to the central fuel supply. The source of fuel being gaseous hydrogen.

A gas turbine engine incorporating any of the above features is also disclosed and claimed.

Although embodiments have been disclosed a worker with skill in this area would recognize the modification would come within the scope of this disclosure. For that reason, the following claims should be studied to determine the true scope and content of this disclosure.

What is claimed is:

1. A combustor comprising:
a liner defining a combustion chamber and receiving a fuel and air mixing body, the fuel and air mixing body having a central fuel supply, and a plurality of radial distribution passages communicating fuel from the central fuel supply radially outwardly relative to a central axis of the central fuel supply and to a plurality of mixing passages, the plurality of radial distribution passages having injection ports in respective ones of the plurality of mixing passages, the plurality of mixing passages extending from a rear face of the fuel and air mixing body to an inner face facing into the combustion chamber, a plurality of air inlets in the fuel and air mixing body for communicating air into respective ones of the plurality of mixing passages, and a cellular material located within each one of the plurality of mixing passages at a location of the injection ports where the fuel is injected into each one of the plurality of mixing passages;
the plurality of radial distribution passages and the plurality of mixing passages further comprising:
a first set of radial distribution passages that communicate fuel into a radially inner set of mixing passages, said first set of radial distribution passages then communicating fuel radially outwardly of said radially inner set of mixing passages into an inner fuel distribution ring; and
a second set of radial distribution passages communicating fuel from the inner fuel distribution ring into a radially outer set of mixing passages, said second set of radial distribution passages then communicating fuel radially outwardly of said radially outer set of mixing passages into an outer fuel distribution ring.

2. The combustor set forth in claim 1, wherein a source of fuel is connected to the central fuel supply, and the source of fuel being gaseous hydrogen.

3. The combustor set forth in claim 1, wherein said radially outer set of mixing passages have a greater cross-sectional area than the radially inner set of mixing passages.

4. The combustor set forth in claim 1, wherein each one of the first set of the radial distribution passages have an inner portion extending from the central fuel supply and through a respective one of the radially inner set of mixing passages to an outer portion to communicate fuel to the inner fuel distribution ring, the inner fuel distribution ring communicating fuel to the radially outer set of said mixing passages, and further comprising a single radial distribution passage extending directly from the central fuel supply to the inner fuel distribution ring without passing through any of the mixing passages.

5. The combustor set forth in claim 1, wherein each one of the radial distribution passages have an inner portion and an outer portion, and the inner and outer portions being separate and circumferentially spaced around a respective one of the mixing passages.

6. The combustor set forth in claim 1, wherein the central fuel supply defines a central axis, said mixing passages extend along a direction with a radially inward component relative to said central axis.

7. The combustor set forth in claim 6, wherein a source of fuel is connected to the central fuel supply, and the source of fuel being gaseous hydrogen.

8. A gas turbine engine comprising:
a compressor section and a turbine section;
a combustor intermediate said compressor section and said turbine section, the combustor including:
a liner defining a combustion chamber and receiving a fuel and air mixing body, the fuel and air mixing body having a central fuel supply, and a plurality of radial distribution passages communicating fuel from the central fuel supply radially outwardly relative to a central axis of the central fuel supply and to a plurality of mixing passages, the plurality of radial distribution passages having injection ports in respective ones of the plurality of mixing passages, the plurality of mixing passages extending from a rear face of the fuel and air mixing body to an inner face facing into the combustion chamber, and there being a plurality of air inlets in the fuel and air mixing body for communicating air into respective ones of the plurality of mixing passages, and a cellular material located within each one of the plurality of mixing passages at a location of the injection ports where the fuel is injected into each one of the plurality of mixing passages;
the plurality of radial distribution passages and the plurality of mixing passages further comprising:
a first set of radial distribution passages that communicate fuel into a radially inner set of mixing passages, said first set of radial distribution passages then communicating fuel radially outwardly of said radially inner set of mixing passages into an inner fuel distribution ring; and
a second set of radial distribution passages communicating fuel from the inner fuel distribution ring into a radially outer set of mixing passages, said second set of radial distribution passages then communicating fuel radially outwardly of said radially outer set of mixing passages into an outer fuel distribution ring.

9. The gas turbine engine set forth in claim 8, wherein a source of fuel is connected to the central fuel supply, and the source of fuel being gaseous hydrogen.

10. The gas turbine engine set forth in claim 8, wherein said radially outer set of mixing passages have a greater cross-sectional area than the radially inner set of mixing passages.

11. The gas turbine engine set forth in claim 8, wherein each one of the first set of the radial distribution passages have an inner portion extending from the central fuel supply and through a respective one of the radially inner set of mixing passages to an outer portion to communicate fuel to the inner fuel distribution ring, the inner fuel distribution ring communicating fuel to the radially outer set of said mixing passages, and further comprising a single radial distribution passage extending directly from the central fuel supply to the inner fuel distribution ring without passing through any of the mixing passages.

12. The gas turbine engine set forth in claim 8, wherein each one of the radial distribution passages have an inner portion and an outer portion, and the inner and outer portions being separate and circumferentially spaced around a respective one of the mixing passages.

13. The gas turbine engine set forth in claim 8, wherein the central fuel supply defines a central axis, said mixing passages extend along a direction with a radially inward component relative to said central axis.

14. The gas turbine engine set forth in claim 13, wherein a source of fuel is connected to the central fuel supply, and the source of fuel being gaseous hydrogen.

\* \* \* \* \*